United States Patent
Dietmeier

(10) Patent No.: US 7,401,511 B2
(45) Date of Patent: Jul. 22, 2008

(54) COAXIAL GAPLESS GUIDE-THROUGH ASSEMBLY FOR A FILING LEVEL SENSOR

(75) Inventor: Juergen Dietmeier, Hausach (DE)

(73) Assignee: VEGA Grieshaber KG, Wolfach (DE)

( * ) Notice: Subject to any disclaimer, the term of this patent is extended or adjusted under 35 U.S.C. 154(b) by 143 days.

(21) Appl. No.: 10/980,853

(22) Filed: Nov. 3, 2004

(65) Prior Publication Data

US 2005/0150568 A1    Jul. 14, 2005

Related U.S. Application Data

(60) Provisional application No. 60/529,313, filed on Dec. 12, 2003.

(51) Int. Cl.
  *G01D 21/00* (2006.01)
  *G01F 23/00* (2006.01)
(52) U.S. Cl. .................. 73/290 R; 73/866.5
(58) Field of Classification Search ........... 73/290 V, 73/866.5, 290 R, 304 C; 367/908; 342/124; 702/56
See application file for complete search history.

(56) References Cited

U.S. PATENT DOCUMENTS

| | | | | |
|---|---|---|---|---|
| 4,054,744 | A | * 10/1977 | Beaman | 174/151 |
| 5,677,008 | A | 10/1997 | Kameya et al. | 427/428.12 |
| 5,739,441 | A | 4/1998 | Friese et al. | 73/866.5 |
| 5,827,985 | A | * 10/1998 | Grieger et al. | 73/866.5 |
| 5,907,112 | A | 5/1999 | Queyquep | 73/866.5 |
| 5,992,251 | A | * 11/1999 | Grieger et al. | 73/866.5 |
| 6,019,007 | A | * 2/2000 | Grieger et al. | 73/866.5 |
| 6,118,282 | A | * 9/2000 | Grieger | 324/637 |
| 6,155,112 | A | 12/2000 | Eckert et al. | 73/290 V |
| 6,247,362 | B1 | 6/2001 | Soroka | 73/290 V |

(Continued)

FOREIGN PATENT DOCUMENTS

DE    2744864 A1    4/1979

(Continued)

OTHER PUBLICATIONS

"Austrian Search Report for Application No. V 7529 UP", 4 Pages.

(Continued)

*Primary Examiner*—Hezron E. Williams
*Assistant Examiner*—Tamiko D Bellamy
(74) *Attorney, Agent, or Firm*—Schwegman, Lundberg and Woessner, P.A.

(57) ABSTRACT

The present invention relates to a guide-through assembly (4) for a filling level sensor working according to the principle of delay measurement of guided electromagnetic waves or for a capacitive filling level sensor, which for sealing the interior of the vessel against the interior of the sensor has no elastomeric sealing materials and in particular no elastomeric o-rings seals. This can be ensured by precisely machining the components which are essentially concentrically arranged in the guide-through assembly (4) on their circumferential surfaces (10, 11), so that in an assembled state the components arranged in the guide-through assembly (4), such as the interior conductor (7) and the dielectric materials (9, 12, 14) surrounding the interior conductor (7), contact each other at their mutually adjacent circumferential surfaces (11) in a sealing and positive engagement, so that additional sealing elements are not needed.

29 Claims, 1 Drawing Sheet

U.S. PATENT DOCUMENTS

| | | | |
|---|---|---|---|
| 6,750,657 B2* | 6/2004 | Griessbaum et al. | 324/642 |
| 7,081,012 B2 | 7/2006 | Gensert et al. | 439/559 |
| 2002/0124658 A1 | 9/2002 | Schmidt | 73/856 |

FOREIGN PATENT DOCUMENTS

| | | |
|---|---|---|
| DE | 3050189 A1 | 4/1983 |
| DE | 4404745 | 8/1995 |
| DE | 19515897 C1 | 7/1996 |
| DE | 10117976 A1 | 8/2002 |
| EP | 0834722 A2 | 4/1998 |
| EP | 0928955 A2 | 7/1999 |
| EP | 0767907 B1 | 7/2003 |
| EP | 1353818 B1 | 12/2004 |

OTHER PUBLICATIONS

Dupont, "Hochleistungs-Fertigteile und Halbzeuge aus Vespel Polyimid", *DuPont Vespel Polyimide*, 1-13.

Dupont, "Vespel Forward Engineering", *The Five Families of Vespel Parts and Shapes*, (2003),1-8.

Dupont, "Vespel S Line—Typical Properties of Vespel Parts & Shapes", *Dupont Vespel*, 1-15.

"Austrian Search Report for Application No. V 7529 UP", 4 Pages, Jun. 17, 2004.

Dupont, "Hochleistungs-Fertigteile und Halbzeuge aus Vespel Polyimid", *DuPont Vespel Polyimide*, 1-13 , (2003).

Dupont, "Vespel S Line—Typical Properties of Vespel Parts & Shapes", *Dupont Vespel*, 1-15 , Jun. 2002.

\* cited by examiner

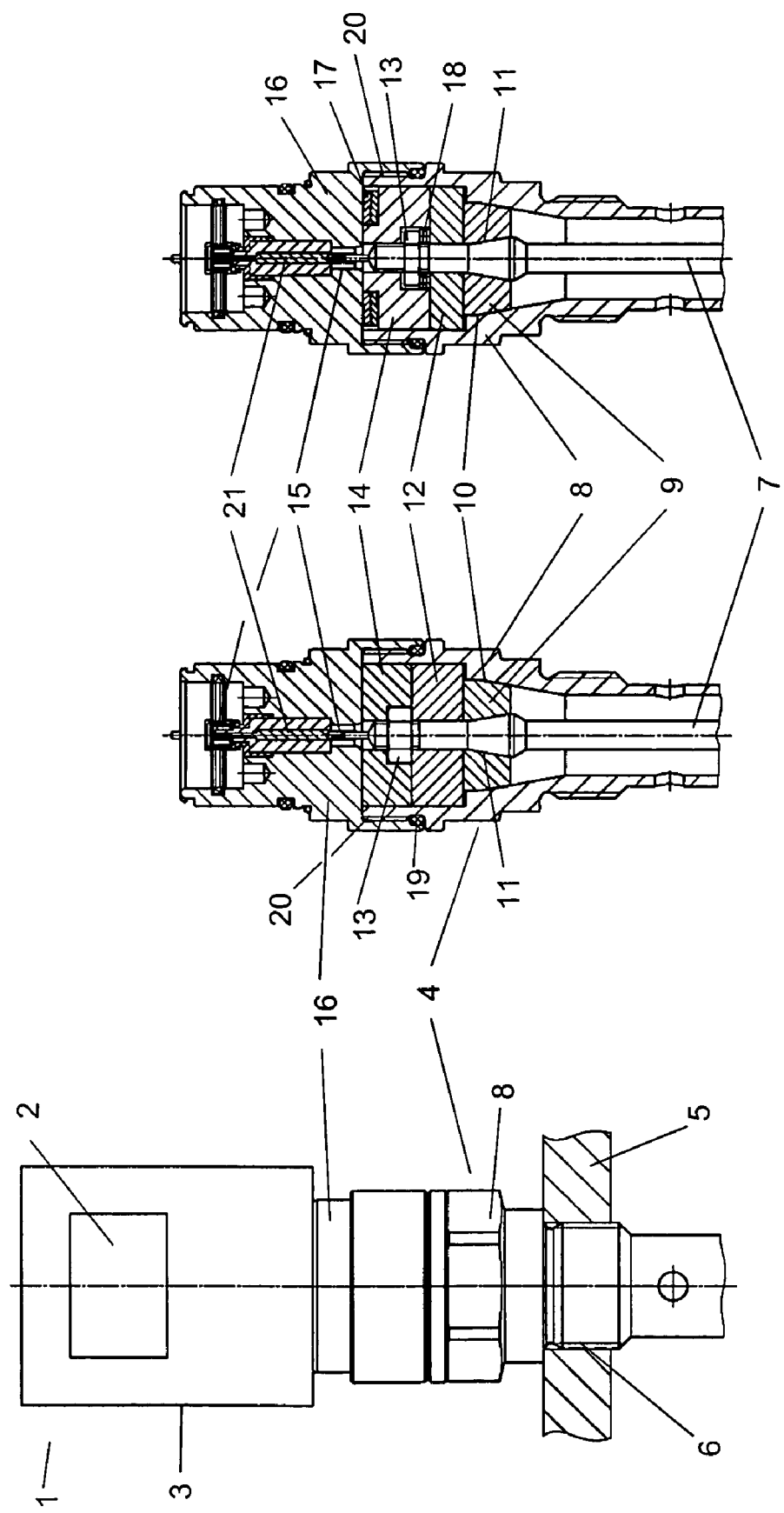

COAXIAL GAPLESS GUIDE-THROUGH ASSEMBLY FOR A FILING LEVEL SENSOR

CROSS-REFERENCE TO RELATED APPLICATIONS

This application claims the benefit under 35 U.S.C. 119 (e) of U.S. Provisional Application No. 60/529,313 filed on Dec. 12, 2003, which is hereby incorporated by reference in its entirety.

TECHNICAL FIELD OF THE INVENTION

The present invention relates generally to a guide-through assembly for a filling level sensor of the generic kind more closely defined in the following and to be attached in or on a vessel. In particular, the invention relates to a guide-through assembly for a filling level sensor working according to the principles of the delay measurement of guided electromagnetic waves (a TDR filling level sensor), or for a capacitive filling level sensor, requiring no elastomeric sealing materials and in particular no elastomeric o-ring seals to seal the interior of the vessel against the interior of the sensor.

BACKGROUND OF THE INVENTION

For the measurement of filling levels measuring systems are often used which operate by measuring the delay required by an electromagnetic wave sent out from a filling level sensor attached in the vessel cover to reach the filling matter surface and return. When the height of the vessel is known, the desired filling level can be computed. Such sensors, also known as filling level radar in the pertinent art, usually rely on the fact that electromagnetic waves propagate at constant speeds within a homogeneous non-conducting medium and are at least partially reflected at the boundary surface of differing media. Each boundary layer of two media with different dielectric constants causes a radar echo of the incident wave. The greater the difference in the two dielectric constants, the greater the change in wave resistance of the wave propagation and the stronger the echo that will be observed.

To determine the desired wave delay, different radar principles are known. Two frequently used techniques are on the one hand the impulse delay technique (impulse radar) and on the other hand the frequency modulated continuous wave technique (FMCW radar). The impulse radar relies on pulse form amplitude modulation of the wave to be radiated and determines the direct time duration between transmitting and receiving the impulse. The FMCW radar, on the other hand, determines the delay in an indirect manner by transmitting a frequency modulated signal and determining the difference between a transmitted and a received momentary frequency.

Apart from the various radar principles, depending on the application, various frequency areas of electromagnetic waves are used. There are, for example, impulse radar devices with carrier frequencies in the area of between 5 and 30 GHz and also those which work in the base band as so-called mono pulse radars without a carrier frequency.

A series of methods and devices is also known which guide electromagnetic waves to the filling matter surface and back. In principle, a distinction can be made between waves radiated into space and waves guided by a conductor. A filling level measuring device in which microwaves are guided via a coaxial conductor into an antenna for radiating an electromagnetic wave, is known, for example, from EP 0 834 722 A2. Herein, the antenna is configured to be bipartite and comprises a first antenna portion in the form of a solid cylinder of a dielectric material surrounded by a metal sleeve. Adjacent to this first antenna portion is a second antenna portion which radiates the wave signal towards the filling matter. The filling level measuring device itself is attached within a vessel nozzle by means of a flange attachment, wherein a separate sealing element is inserted to provide a seal between the vessel flange and the housing flange.

The filling level sensors working according to the principle of delay measurement of guided electromagnetic waves, also referred to as time domain reflectometry (TDR) filling level sensors, have a different structure with respect to guide-through and signal guidance. In these filling level sensors an electromagnetic wave is guided via a conductor, such as a probe in the form of a metallic cable or rod, to the point of reflection and from there back to the sensor.

These sensors have considerably less damping of the reflected echo signals than those which freely radiate high frequency waves, because the power flows only in the very limited area in the vicinity along the conductive wave guide. Interfering echoes from within the vessel, such as caused by reflections of the wave on structures within the vessel (stirring apparatus, tubes), and which, with freely radiating sensors, make the identification of the one echo from the filling material surface difficult, are largely avoided with sensors having guided waves. This means that the filling level measurement using guided electromagnetic waves is largely independent of the vessel construction and also of the product quality of the filling matter or other operating conditions (e.g. dust, angle of bulk material) and thus leads to reliable measuring results.

Any known conductors of high frequency waves may be used as the wave conductor for guiding the wave, wherein the wave at least partially penetrates the medium which surrounds the metallic conductor or is surrounded by it. Due to its simple mechanical construction and its suitability for all kinds of filling matter, i.e. bulk materials and liquids, the single-wire conductor or the single conductor probe is often used in the filling level measuring field. When it is configured as a rod or cable probe, it is particularly insensitive to filling matter build-up and attachment. DE 44 04 745 C2 describes an exemplary filling level sensor with such a probe.

The conduction path between the electronics and the probe with such filling level sensors almost always comprises the above-mentioned guide-through assembly and an additional coaxial cable which establishes the connection to the sensor's electronics on which the electronic circuit for generating the transmission signal and the evaluation of the reflected signal resides. The coaxial cable can be eliminated in some special cases where the printed circuit board has a direct electrical and mechanical connection to the guide-through assembly. The guide-through assembly has the function of guiding the measuring signal from the sensor attached on the outside of the filling matter vessel to the probe extending on the inside of the vessel. It must also provide mechanical support to the probe. For this purpose, it usually has a metallic process connection which can be fixedly attached in the vessel, e.g. in a cover opening of the same, and which receives an interior conductor to guide the wave. In order to avoid any short circuits, there is an insulating element between the carrier element and the conductor element. The interior conductor connects the coaxial cable usually leading to the electronics on the one hand and the probe protruding into the vessel on the other hand.

Conventional guide-through assemblies for single-conductor probes usually have a coaxial structure, i.e. the interior conductor is coaxially surrounded by the insulating element and the process connection. While this basic structure can be technically realised in various ways, usually certain requirements must be met, such as sealing the vessel atmosphere, pressure resistance, resistance to high tensile forces on the probe, resistance to high temperatures and resistance against an aggressive vessel atmosphere. In particular, to meet the sealing requirements, usually elastomeric sealing elements must be provided in the guide-through assembly in order to seal the interior of the vessel against the interior of the sensor housing.

The structure of a capacitive filling level sensor is very similar to the above-described structure of a TDR filling level sensor. The measuring principle of such capacitive filling level sensors is based on the fact that the filling matter and the vessel together with the measuring probe form an electrical capacitor. In this measuring technique, the filling level is detected by measuring the capacitor's capacitance, which varies as the filling level varies, and which allows the filling height to be determined.

Such capacitive filling level sensors are known, for example, from DE 027 44 864 A1 or DE 030 50 189 A1, from which the structure of capacitive filling level sensors, which is similar to TDR filling level sensors, can be seen. These sensors also have an internal conductor which is insulated with respect to a process connection. To meet the sealing requirements, also in connection with these capacitive filling level sensors, sealing elements must be provided in the guide-through assembly in order to seal the interior of the vessel against the interior of the sensor. Such sealing elements are usually of resilient, partially crystalline or thermoplastic materials, such as polytetrafluoroethylene (PTFE). However, such materials usually have a drawback in that they begin to get brittle or to flow when exposed to high pressures and/or temperatures, which is why such sealing elements are not suitable for filling level sensors exposed to high pressures and/or temperatures.

SUMMARY OF THE INVENTION

To solve the above-described sealing problem, it is one object of the present invention to provide a guide-through means for a filling level sensor which, while ensuring a tight seal between the interior of the vessel and the interior of the sensor, is not affected by the problem of the usual sealing elements that begin to flow when exposed to high pressures and/or temperatures and therefore do not permanently fulfil the sealing requirements. When filling level sensors are mentioned in the following, they are to be construed to mean both the above-described TDR filling level sensors and capacitive filling level sensors.

To solve the above-described problem, according to a first aspect of the invention, a guide-through assembly for a filling level sensor to be mounted in or on a vessel is provided, in which for sealing the interior of the vessel against the interior of the sensor, separate sealing elements do not have to be provided, but wherein the sealing function is solely based on the fact that the components essentially concentrically arranged in the guide-through assembly are precision-machined for example, using CNC machine tools so that in a mounted state the components arranged in the guide-through assembly contact each other at their mutual circumferential surfaces in a sealing and positively engaging way so that additional sealing elements may be eliminated.

One advantage to be attained with the present invention is therefore that due to the precise fit achieved by the machining of the circumferential surfaces of the essentially concentrically arranged components of the guide-through assembly no additional sealing elements need be arranged, so that despite any pressure and/or temperature influences the seal between the interior of the vessel and the interior of the sensor can be permanently ensured. Another advantage of the present invention is that due to the elimination of additional sealing elements, the entire guide-through assembly has a simpler and cheaper construction. Another possible advantage of the present invention is that despite any temperature and/or pressure influences the sealing between the interior of the vessel and the interior of the sensor is permanently ensured, which permanently ensures the operating safety of the entire filling level sensor.

According to another aspect of the present invention, the guide-through assembly has a process connection arranged within an interior conductor which on the one hand extends through a solid-state insulating body which both surrounds the interior conductor in a positive engagement in a sealing way on its circumferential surface and also fits in the process connection in a positive engagement. As can be seen, the exterior circumferential surface of the interior conductor contacts the insulating body in a closely adjacent relationship, which in turn has its circumferential surface entirely closely fitted in the process connection. By having the insulating sealing body prefabricated as a solid body whose circumferential surface is manufactured to such precision that it sealingly contacts the corresponding circumferential surfaces of either the interior conductor or the process connection, additional sealing elements, for example of elastomeric material, are not needed, which are usually affected by the above-described sealing problems due to the effects of high pressures and/or temperatures.

While the adjacent circumferential surfaces of the process connection, the interior conductor and the insulating sealing body may be machined to such precision that they contact each other so tightly that in the optimum case no gas exchange is possible through each adjacent pair of circumferential surfaces, the insulating sealing body is made of a plastic material to compensate for any unevenness due to surface defects of the circumferential surfaces, since the plastic material can compensate such unevenness due to a certain resilience. Preferably, the insulating sealing body is of a temperature-insensitive, resilient, pressure-resistant, creep and/or flow-resistant plastic material with dielectric properties, such as a polyimide, which helps to ensure that the guide-through assembly situated between the interior of the vessel and the interior of the sensor remains permanently sealed, also in unfavourable process conditions such as chemical influences, atmospheric process pressures and high temperatures. Trials have shown that the VESPEL® material, especially the SP1 type, is particularly suitable, while other types of VESPEL® or similar generic materials can, of course, also be used in corresponding conditions of application.

The materials which have been shown to be particularly suitable for the insulating sealing body are distinguished by their good form and dimensional stability, which is due to a well adjusted combination of the essential material parameters. It may, for example, be important that the materials have no discernible softening or melting point. Also, low coefficients of thermal expansion and excellent creep and brittling resistances help to keep dimensions stable. Due to this stability, the insulating sealing body can be made to such low tolerances as have been inconceivable with plastic materials before. This dimensional stability results in the sealing member, for example of VESPEL® or a polyimide, keeping its form and function also in extreme process conditions. The materials which have shown to be particularly suitable, such as VESPEL® or polyimide, combine the favourable dimensional stability with a toughness which conventional plastic materials usually lack. Moreover, these materials have shown to be suitable because they do not melt at temperatures as high as about 290° C. and, for short durations, as high as about 500° C. and therefore remain uniformly dimensionally stable and strong also with high temperatures over longer periods of time.

As can be seen from the preceding explanations, the interior conductor is circumferentially surrounded by the insulating sealing body which, in turn, is fitted into the process connection. In order to simplify terminology in the following, the exterior circumferential surfaces of the interior conductor, which the insulating sealing body circumferentially contacts in a positive and therefore sealing engagement, will be referred to as the outer circumferential surface of the interior conductor. Similarly, the insulating sealing body has an interior circumferential surface which contacts the exterior circumferential surface of the interior conductor in a positive and therefore sealing engagement and exactly fits onto the latter. Similarly, the insulating sealing body also has an exterior circumferential surface, while the process connection also has an interior circumferential surface which in the assembled state of the insulating sealing body within the process connection fit together in a positive and therefore sealing engagement.

According to another aspect of the present invention, both the interior circumferential surface of the insulating sealing body and the exterior circumferential surface of the interior conductor have a conical or tapered section, wherein the contours of the two sections are complementary to each other and fit together closely in a positive and therefore sealing engagement, so that the interior conductor can be fitted into the corresponding section of the insulating sealing body in a sealing manner. Similarly, both the interior circumferential surface of the process connection and the exterior circumferential surface of the insulating sealing body have a conical or tapering section, wherein the contours of these two sections are complementary to each other and fit into each other in a positive and therefore sealing engagement, so that the insulating sealing body with its conical or tapering section can be fitted, fully sealed, into the corresponding section of the process connection.

As can be seen from the preceding explanations, the interior circumferential surface of the process connection, the exterior circumferential surface of the insulating sealing body, as well as the interior circumferential surface of the insulating sealing body, and the exterior circumferential surface of the interior conductor have conical or tapering sections, wherein all of these conical or tapering sections are adapted to each other and fit together in such a way that each pair of contacting circumferential surfaces contact each other in a fully sealing way.

One of the advantages of the conical or tapering form is that a process pressure present in the vessel acts on the interior conductor in such a way that the interior conductor with its conical or tapering section is increasingly pressed into the insulating sealing body and is increasingly jammed into the latter. This causes the pressure between the interior circumferential surface of the insulating sealing body and the exterior circumferential surface of the interior conductor to increase, which in turn causes the insulating sealing body to have its interior circumferential surface contact and seal the conical section of the interior conductor. In order to gain full advantage, however, the conical or tapering section of the insulating sealing body must be on the side facing the interior of the vessel, so that the wedge action may be effected in the described way by the process pressure present in the vessel. It is, of course, also possible to align the conical or tapering section of the interior circumferential surface of the insulating sealing body in such a way that the opening passage tapers through the insulating sealing body toward the interior of the vessel. In this case, however, additional means would have to be provided in order to ensure the positive and sealing fit of the interior conductor within the insulating sealing body.

To gain full advantage of this wedge action due to a process pressure present in the interior of the vessel, also for jamming the insulating sealing body within the process connection, the conical or tapering section of the interior circumferential surface of the process connection must be aligned in such a way that its larger diameter faces the interior of the vessel.

While this may be a practicable approach, the conical or tapering section of the interior circumferential surface of the process connection, according to another aspect of the present invention, is preferably arranged in such a way that it tapers toward the interior of the vessel. While this means that in this case the wedge action associated with a process pressure present in the interior of the vessel cannot be used to jam the insulating sealing body within the process connection, the present embodiment is advantageous in a way that will be explained in the following.

In order to facilitate simple and fast assembly of the guide-through assembly of the present invention, at first the interior conductor is pre-assembled with the insulating sealing body. To do this, the insulating sealing body is slipped onto the interior conductor and the conical or tapering section of the interior conductor is driven into the corresponding conical or tapering section of the insulating sealing body. Then a support washer of a hard dielectric plastic material, such as PPS GF40, is slipped over the interior conductor, so that it lies flat against the side of the insulating sealing body facing the smaller conical diameter of the interior circumferential surface of the insulating sealing body. Then a nut is screwed onto the interior conductor clamping the insulating sealing body against the support washer and causing the conical section of the exterior circumferential surface of the interior conductor to be driven into the conical section of the interior circumferential surface of the insulating sealing body and to be closely clamped to the latter. This pre-assembly of the interior conductor and the insulating sealing body provides a further advantage of the present invention in that the individual components of the guide-through assembly need not be individually mounted in the process connection, but a very economical pre-assembly is possible which can also be farmed out to subcontractors as necessary.

In a directly following manufacturing step this assembly comprising the interior conductor, the insulating sealing body, the support washer and the nut can be inserted into a process connection from the top. As mentioned before, it is advantageous to align the section of the interior circumferential surface of the process connection in such a way that it tapers towards the interior of the vessel. This can be achieved by simply inserting the interior conductor pre-assembled with the insulating sealing body in the process connection so that the exterior circumferential surface of the insulating sealing body is firmly jammed with the interior circumferential surface of the process connection due to the force effected by the weight of the prefabricated assembly, and thus a gastight separation is ensured between the interior of the vessel and the interior of the sensor. However, in order to secure the assembly of the interior conductor and the insulating sealing body inserted in the process connection against the process pressures present in the interior of the vessel, it is fastened in the process connection with suitable attachment means. For example, the assembly comprised of the interior conductor, the insulating sealing body and the support washer can be pressed into, and held in the conical recess of the process connection by using a ring with an exterior thread which is suitable to be screwed into an interior thread in the wall of the process connection to thereby firmly press the prefabricated assembly into the process connection via the support washer.

According to another aspect of the present invention, the pressure force which is necessary to press the prefabricated interior conductor together with the support washer and the nut into the process connection is generated by a connection adapter which secures the transition between the process connection and the actual sensor housing in which the sensor electronics is also accommodated. The pressure force required to press the prefabricated interior conductor into the process connection can be provided by screwing the connection adapter onto the process connection, causing an abutment surface of the connection adapter facing the support washer to approach the support washer, to contact it and to press the prefabricated assembly of the interior conductor and the support washer firmly into the process connection by screwing the connection adapter onto the process connection.

According to an embodiment of the present invention, it may be advantageous to first insert the assembly comprising the interior conductor, the insulating sealing body, the support washer and the nut in the process connection, and to then insert a pressure member, which is also made, for example, of a hard plastic material, such as PPS GF40, from the top into the process connection, so that the abutment surface of the connection adapter does not directly press against the support washer, but the pressure force is exerted on the prefabricated assembly via the pressure member.

BRIEF DESCRIPTION OF THE DRAWINGS

To provide a better understanding and for further explanation, a plurality of exemplary embodiments of the present invention will be described in detail in the following with reference to the drawings, in which:

FIG. 1 is a view of a filling level sensor screwed into a vessel;

FIG. 2 is a longitudinal sectional view of the filling level sensor of FIG. 1, wherein, however, the actual sensor housing has been omitted; and FIG. 3 shows another embodiment of a guide-through assembly for a filling level sensor in a longitudinal sectional view.

In the drawing figures the same elements are represented by the same reference numerals throughout.

DESCRIPTION OF EXEMPLARY
EMBODIMENTS OF THE INVENTION

FIG. 1 shows a filling level sensor 1, such as a TDR filling level sensor or a capacitive filling level sensor, which is fixed in a vessel wall 5. Filling level sensor 1 essentially comprises three housing portions 3, 16, 8 connected to each other. These form the actual sensor housing 3, in which sensor electronics unit 2, only schematically shown, is accommodated. This actual sensor housing 3 is connected to the connection adapter 16, for example, via a screw connection.

As can be seen from FIG. 2, connection adapter 16 comprises a solid housing portion through which an interior conductor 21 surrounded by a dielectric material is centrally passed. Interior conductor 21 of connection adapter 16 has the function to establish the electrical contact between sensor electronics 2 and interior conductor 7. To do this, interior conductor 21 of connection adapter 16 has corresponding contacting means 15 at both ends, such as sockets or plugs, in or onto which the corresponding counterparts of the sensor electronics or of interior conductor 7 can be plugged or fitted, respectively.

Connection adapter 16, in turn, is connected with process connection 8 via a screw connection 20 into which, as can be seen from FIG. 2, an o-ring seal 19 is inserted for sealing the interior of the sensor against the exterior atmosphere. Process connection 8 is provided with a screw thread 6 on its circumference to be screwed into vessel cover 5 of a vessel only partially shown in the figure. Instead of screw thread 6, process connection 8 could also be connected to vessel 5 via a flange connection. Process connection 8 designated with reference numeral 8 in FIG. 1 comprises the guide-through assembly 4 of the present invention, which will be more closely described in the following with reference to FIG. 2.

As can be seen from FIG. 2, which shows the filling level sensor of FIG. 1 in a longitudinal sectional view, but without sensor housing 3, connection adapter 16 is screwed into process connection 8 via thread 20, wherein for sealing the interior of the sensor against the exterior atmosphere an o-ring seal 19 is inserted in this screw connection. In the cup-shaped space formed by process connection 8 the prefabricated assembly of interior conductor 7, insulating sealing body 9, support washer 12 and nut 13 is shown to be inserted in a precise fit.

This prefabricated assembly is manufactured by first screwing insulating sealing body 9 onto the top of interior conductor 7 until the interior conical circumferential surface of insulating sealing body 9 is fully adjacent to the section of interior conductor 7 with the exterior conical circumferential surface. Then support washer 12 in the form of a hollow cylinder is slipped over the top of interior conductor 7, until it lies flat against insulating sealing body 9. After this, nut 13 is screwed on top of interior conductor 7 causing support washer 12 to be firmly clamped against insulating sealing body 9. By further tightening nut 13, the conical section of interior conductor 7 is driven or drawn into the conical recess of insulating sealing body 9 causing a surface tension to arise in the interior sealing surface 11 between the exterior circumferential surface of interior conductor 7 and the interior circumferential surface of the exterior conductor. Since insulating sealing body 9 is of a temperature-resistant, pressure-resistant and creep and/or flow-resistant plastic material, such as a polyimide, the insulating sealing body can adapt to any unevenness of the exterior circumferential surface of the conical section of interior conductor 7 due to the surface tension arising in sealing surface 11, ensuring the pressure and gas tightness of the interior sealing surface 11 in spite of any surface unevenness.

The thus prefabricated assembly is then inserted into the cup-shaped cavity of process connection 8 causing the exterior conical circumferential surface of insulating sealing body 9 to contact the interior conical circumferential surface of process connection 8. Since the exterior contour of the exterior conical circumferential surface of insulating sealing body 9 precisely coincides with the interior conical circumferential surface of process connection 8, the two surfaces together form an absolutely tight seal between the interior of the vessel and the interior of the sensor. To withstand any process pressures present in the interior of the vessel and to avoid being pressed out of the sealing position, connection adapter 15 is screwed onto process connection 8 in the manner described above, causing a pressure to be applied to pressure member 14 previously inserted between support washer 12 and connection adapter 15, with which the entire prefabricated assembly of interior conductor 7, insulating sealing body 9, support washer 12 and nut 13 is firmly pressed into the conical seat of process connection 8. In the case where the interior conical circumferential surface of process connection 8 slightly deviates from its set-point geometry, which should ideally coincide with the outer conical circumferential surface of insulating sealing body 9, insulating sealing body 9, due to its above-described material properties, adapts to the interior conical circumferential surface of process connection 8 ensuring the tightness of sealing surface 10.

FIG. 3 shows another embodiment of the guide-through assembly for a filling level sensor shown in FIG. 2, wherein interior conductor 7 is biased by spring element 18, such as a cup spring 18. For this purpose, spring 18 is inserted between nut 13 and support washer 12 in order to press apart these two parts. One advantage of providing spring 18 in the present invention is that any flow or creep deformations of the material of insulating sealing body 9 can be compensated. Similarly, as shown in FIG. 3, the bias of outer sealing surface 10 is also maintained by a plurality of spring elements 17, such as a plurality of cup spring elements 17. To do this, springs 17 are fitted between pressure member 14 and the interior contacting surface of connection adapter 16, wherein the forces acting via pressure member 14 can keep sealing surface 10 permanently sealed despite the creep or flow deformations of insulating sealing body 9. Support washer 12 ensures secure pressing of insulating sealing body 9 and supports pressure forces which can overcome the spring forces, for example, due to the process pressures.

What is claimed is:

1. A guide-through assembly for a filling level sensor attachable in or on a vessel, comprising:
   a process connection to connect to a vessel and including an interior circumferential surface,
   an interior conductor arranged within the process connection,
   a solid-state insulating sealing body through which the interior conductor extends and circumferentially surrounds the interior conductor in a positive sealing engagement and is fitted into the process connection in a positive sealing engagement, the insulating sealing body comprising an exterior circumferential surface;
   wherein both the interior circumferential surface of the process connection and the exterior circumferential surface of the insulating sealing body have a tapered section;
   wherein the tapered section of the insulating sealing body is fixed into the tapered section of the process connection and the entire exterior circumferential surface of the insulating sealing body is in direct contact with some portion of the interior circumference surface of the process connection;
   wherein the interior circumferential surface of the process connection and the exterior circumferential surface of the insulating sealing body are wedged against each other in a gas-tight manner;
   wherein the tapered sections of both the interior circumferential surface of the process connection and the exterior circumferential surface of the insulating sealing body only taper towards the interior of the vessel.

2. The guide-through assembly according to claim 1, wherein the insulating sealing body has a precisely preformed interior circumferential surface, the interior conductor has an exterior circumferential surface, and wherein the interior circumferential surface of the insulating sealing body and the exterior circumferential surface of the interior conductor fit together in a positive sealing engagement.

3. The guide-through assembly according to claim 2, wherein both the interior circumferential surface of the insulating sealing body and the exterior circumferential surface of the interior conductor have a conical or tapering section.

4. The guide-through assembly according to claim 2, wherein the interior circumferential surface of the insulating sealing body and the exterior circumferential surface of the interior conductor are wedged against each other in a gas-tight manner.

5. The guide-through assembly according to claim 3, wherein the conical or tapering section of the interior conductor is driven into the conical or tapering section of the insulating sealing body.

6. A guide-through assembly for a filling level sensor attachable in or on a vessel, comprising:
   a process connection to connect to a vessel and including an interior circumferential surface,
   an interior conductor arranged within the process connection,
   a solid-state insulating sealing body through which said interior conductor extends and circumferentially surrounds the interior conductor in a positive sealing engagement and is fitted into the process connection in a positive sealing engagement, the insulating sealing body comprising an exterior circumferential surface;
   wherein both the interior circumferential surface of the process connection and the outer circumferential surface of said insulating sealing body have a tapered section;
   wherein the tapered section of said insulating sealing body is fixed into the tapered section of said process connection;
   wherein the interior circumferential surface of said process connection and the outer circumferential surface of said insulating sealing body are wedged against each other in a gas-tight manner;
   wherein both the interior circumferential surface of the insulating sealing body and the outer circumferential surface of said interior conductor have a conical or tapering section;
   wherein the conical or tapering section of said interior conductor is driven into the conical or tapering section of said insulating sealing body; and
   wherein said interior conductor extends through a support washer which lies flat against the side of the insulating sealing body facing towards the smaller diameter of the conical section of the interior circumferential surface of said insulating sealing body and is clamped against said insulating sealing body, causing the conical section of the exterior circumferential surface of said interior conductor to be driven into the conical section of the interior circumferential surface of said insulating sealing body and to be wedged against the latter.

7. The guide-through assembly according to claim 6, wherein the support washer is clamped against the insulating sealing body by means of a nut which can be screwed onto said interior conductor.

8. The guide-through assembly according to claim 7, wherein between said nut and said insulating sealing body, a spring element is positioned in order to compensate for any deformations due to creep.

9. The guide-through assembly according to claim 6, wherein the tapered sections of both the interior circumferential surface of said process connection and the exterior circumferential surface of said insulating sealing body taper towards the interior of the vessel.

10. The guide-through assembly according to claim 9, wherein said interior conductor also extends through a support washer which lies flat against a side of said insulating sealing body facing towards a larger diameter of the tapered section of the exterior circumferential surface of said insulating sealing body and to which an exterior pressure force is to be applied, causing the conical section of the exterior circumferential surface of said insulating sealing body to be driven into the conical section of the interior circumferential surface of said process connection and to be wedged against the latter.

11. The guide-through assembly according to claim 10, wherein the exterior pressure force is applied by a connection adapter screwed onto the process connection from the outside of the vessel and causing a pressure member positioned between the connection adapter and the support washer to be clamped against the support washer.

12. The guide-through assembly according to claim 11, wherein between said connection adapter and the support washer, a spring element is arranged to compensate for any deformations due to creep.

13. The guide-through assembly according to claim 1, wherein said insulating sealing body is made of a temperature-resistant, pressure-resistant, creep and flow-resistant plastic material.

14. The guide-through assembly according to claim 13, wherein said insulating sealing body is made of a polyimide.

15. The guide-through assembly according to claim 14, wherein said insulating sealing body comprises a temperature-resistant, pressure-resistant, creep and flow-resistant polyimide; and wherein said interior conductor is adapted to be in electrical contact with a socket of a connection adapter being screwed onto the process connection.

16. A filling level sensor, comprising:
a guide-through assembly comprising a process connection, an interior conductor positioned within the process connection and a solid-state insulating sealing body through which the interior conductor extends, the solid-state insulating sealing body surrounding the interior conductor in a positive sealing engagement, the solid-state insulating sealing body surrounding is fitted into the process connection in a positive sealing engagement,
a connection adapter removably connected to the process connection causing the insulating sealing body to be firmly pressed into and wedged against the process connection,
wherein both the interior circumferential surface of the process connection and the exterior circumferential surface of the insulating sealing body have a conical or tapering section,
wherein the tapered sections of both the interior circumferential surface of the process connection and the exterior circumferential surface of the insulating sealing body taper towards the interior of the vessel;
wherein the conical or tapering section of the insulating sealing body is pressed into the conical or tapering section of the process connection; and
wherein the interior circumferential surface of the process connection and the exterior circumferential surface of the insulating sealing body are wedged against each other in a gas-tight manner and the entire exterior circumferential surface of the insulating sealing body is in direct contact with some portion of the interior circumference surface of the process connection.

17. The filling level sensor of claim 16, wherein the connection adapter is in threaded engagement with the process connection.

18. A filling level sensor, comprising:
a guide-through assembly comprising a process connection, an interior conductor positioned within said process connection and a solid-state insulating sealing body through which the interior conductor extends, the solid-state insulating sealing body surrounding the interior conductor in a positive sealing engagement, the solid-state insulating sealing body surrounding is fitted into the process connection in a positive sealing engagement,
a connection adapter removably connected to the process connection causing said insulating sealing body to be firmly pressed into and wedged against said process connection,
wherein both the interior circumferential surface of the process connection and the exterior circumferential surface of said insulating sealing body have a conical or tapering section;
wherein the conical or tapering section of said insulating sealing body is pressed into the conical or tapering section of said process connection; and
wherein the interior circumferential surface of said process connection and the exterior circumferential surface of said insulating sealing body are wedged against each other in a gas-tight manner; and
wherein the insulating sealing body includes flat surface, and wherein the guide-through assembly comprises a flat face washer on the flat surface of the insulating sealing body.

19. The filling level sensor of claim 18, wherein the interior conductor includes external threads, and wherein the guide-through assembly comprises a nut engaging the external threads and pressing the washer toward the insulating sealing body.

20. The filling level sensor of claim 19, wherein said insulating sealing body comprises a temperature-resistant, pressure-resistant, creep and flow-resistant polyimide.

21. The guide-through assembly according to claim 1, wherein the circumferential surface of said process connection and the outer circumferential surface of said insulating sealing body are free of additional sealing elements.

22. The guide-through assembly according to claim 8, wherein the tapered sections of both the interior circumferential surface of said process connection and the exterior circumferential surface of said insulating sealing body taper towards the interior of the vessel.

23. A guide-through assembly for a filling level sensor attachable in or on a vessel, comprising:
a process connection to connect to a vessel and including an interior circumferential surface,
an interior conductor arranged within the process connection,
a solid-state insulating sealing body through which said interior conductor extends and circumferentially surrounds the interior conductor in a positive sealing engagement and is fitted into the process connection in a positive sealing engagement, the insulating sealing body comprising an exterior circumferential surface;
wherein both the interior circumferential surface of the process connection and the outer circumferential surface of said insulating sealing body have a tapered section;
wherein the tapered section of said insulating sealing body is fixed into the tapered section of said process connection;
wherein the interior circumferential surface of said process connection and the outer circumferential surface of said insulating sealing body are wedged against each other in a gas-tight manner;
wherein the tapered sections of both the interior circumferential surface of said process connection and the exterior circumferential surface of said insulating sealing body taper towards the interior of the vessel; and wherein said interior conductor also extends through a support washer which lies flat against a side of said insulating sealing body facing towards a larger diameter of the tapered section of the exterior circumferential surface of said insulating sealing body and to which an exterior pressure force is to be applied, causing the conical section of the exterior circumferential surface of said insulating sealing body to be driven into the conical section of the interior circumferential surface of said process connection and to be wedged against the latter.

24. The guide-through assembly according to claim 23, wherein the exterior pressure force is applied by a connection adapter screwed onto the process connection from the outside of the vessel and causing a pressure member positioned between the connection adapter and the support washer to be clamped against the support washer.

25. The guide-through assembly according to claim 24, wherein between said connection adapter and the support washer, a spring element is arranged to compensate for any deformations due to creep.

26. The guide-through assembly according to claim 23, wherein said insulating sealing body is made of a temperature-resistant, pressure-resistant, creep and flow-resistant plastic material.

27. The guide-through assembly according to claim 23, wherein said insulating sealing body is made of a polyimide.

28. The guide-through assembly according to claim 23, wherein said insulating sealing body comprises a temperature-resistant, pressure-resistant, creep and flow-resistant polyimide; and wherein said interior conductor is adapted to be in electrical contact with a socket of a connection adapter being screwed onto the process connection.

29. The filling sensor of claim 18, wherein, wherein the tapered sections of both the interior circumferential surface of said process connection and the exterior circumferential surface of said insulating sealing body only taper towards the interior of the vessel.

* * * * *